(12) United States Patent
Liu et al.

(10) Patent No.: US 8,698,966 B2
(45) Date of Patent: Apr. 15, 2014

(54) SCREEN DEVICE FOR THREE-DIMENSIONAL DISPLAY WITH FULL VIEWING-FIELD

(75) Inventors: Xu Liu, Zhejiang (CN); Haifeng Li, Zhejiang (CN); Xiangdong Liu, Zhejiang (CN); Yuanfang Lin, Zhejiang (CN); Zhenrong Zheng, Zhejiang (CN); Caijie Yan, Zhejiang (CN)

(73) Assignee: Zhejiang University, Hangzhou, Zhejiang (CN)

( * ) Notice: Subject to any disclaimer, the term of this patent is extended or adjusted under 35 U.S.C. 154(b) by 378 days.

(21) Appl. No.: 12/988,204

(22) PCT Filed: Jun. 11, 2008

(86) PCT No.: PCT/CN2008/001126
§ 371 (c)(1),
(2), (4) Date: May 4, 2011

(87) PCT Pub. No.: WO2009/127089
PCT Pub. Date: Oct. 22, 2009

(65) Prior Publication Data
US 2011/0199373 A1    Aug. 18, 2011

(30) Foreign Application Priority Data

Apr. 18, 2008   (CN) .......................... 2008 1 0060768

(51) Int. Cl.
*G02F 1/1335* (2006.01)
(52) U.S. Cl.
USPC .......................................................... 349/15
(58) Field of Classification Search
USPC .......................................................... 349/15
See application file for complete search history.

(56) References Cited

U.S. PATENT DOCUMENTS

| 5,966,167 | A | 10/1999 | Nose et al. |
| 6,714,349 | B2 | 3/2004 | Nam |
| 7,486,341 | B2 * | 2/2009 | Hong et al. ..................... 349/11 |
| 2003/0137730 | A1 | 7/2003 | Fridman et al. |
| 2005/0078368 | A1 | 4/2005 | Racette et al. |
| 2005/0219693 | A1 | 10/2005 | Hartkop et al. |
| 2006/0114561 | A1 | 6/2006 | Mashitani et al. |
| 2008/0136981 | A1 * | 6/2008 | Kawakami et al. ............. 349/15 |
| 2012/0105741 | A1 * | 5/2012 | Takao ........................... 348/836 |

FOREIGN PATENT DOCUMENTS

| CN | 1098239 A | 2/1995 |
| CN | 1695077 A | 11/2005 |

OTHER PUBLICATIONS

International Search Report from corresponding PCT Application No. PCT/CN2008/001126, mailed Jan. 22, 2009, 4 pages.
International Preliminary Report on Patentability and Written Opinion from corresponding PCT Application No. PCT/CN2008/001126, mailed Oct. 19, 2010, 5 pages.

* cited by examiner

*Primary Examiner* — Timothy L Rude
(74) *Attorney, Agent, or Firm* — Fish & Richardson P.C.

(57) ABSTRACT

A screen device for three-dimensional display with full viewing-field comprises a display screen (2), a rotation device (3) for the display screen, and an optical device (1) disposed in front side of the display screen (2). The optical device (1) may be a two dimensional diaphragm array (5) with inclined openings, a vertical lenticular lens array (6), a combination of a two dimensional diaphragm array (7) with vertical openings and a lens (8), or a combination of a two dimensional microlens array (9), a vertical diffusion screen (10) and a cylindrical lens (11).

10 Claims, 3 Drawing Sheets

SCREEN DEVICE FOR THREE-DIMENSIONAL DISPLAY WITH FULL VIEWING-FIELD

TECHNICAL FIELD

The present invention relates to optical device, and in particular, to a screen device realizing spatially three-dimensional (3-D) display with omnidirectional views.

BACKGROUND ART

Technologies for 3-D display in real space mainly include, among others, spatially 3-D holographic display and spatially 3-D volumetric display. In contrast to a parallax type of 3-D display, the two types of 3-D display are 3-D display in real space, and can be viewed with naked eye in the 360-degree angles. Spatially 3-D holographic display, however, requires a high-resolution, high-speed spatial light modulator in terms of dynamic display, and the technical requirement for reconstructing dynamic 3-D holographic image cannot be met currently. For spatially 3-D volumetric display technology, a main problem of missing occlusion exists for spatial 3-D display, since addressing and display is performed in a display real space. How to realize a 3-D display technology that has a real spatial sense and is achievable with currently available technologies, and can overcome the problem of missing occlusion in spatially 3-D volumetric display, would be technically crucial.

DISCLOSURE OF THE INVENTION

An object of the invention is to overcome the shortcomings of prior art to provide a screen device realizing spatially 3-D display with omnidirectional views.

A screen device realizing spatially 3-D display with omnidirectional views comprises a display screen, a screen rotation device and an optical device disposed in a front side of the display screen, wherein the optical device is a 2-D diaphragm array with inclined openings, a vertical lenticular lens array, a combination of a 2-D diaphragm array with vertical openings and a lens, or a combination of a 2-D lenslet array, a vertical direction-selective diffusion screen and a cylindrical lens.

The 2-D diaphragm array with inclined openings may be configured such that each diaphragm in the 2-D diaphragm array with inclined openings is corresponded to a position of pixel of the display screen, and the light beam of the pixel in the horizontal direction is restricted by the diaphragm to be a light beam divergent with a small angle; the lines connecting the openings of all the diaphragms with the respective positions of their corresponding pixels intersect spatially to form a viewing region.

The vertical lenticular lens array may be configured such that each vertical lenticular lens of the vertical lenticular lens array is corresponded to a column position of a respective pixel of the display screen, and the light beams in the horizontal direction of all the columns of the pixels are restricted by their corresponding vertical lenticular lenses to become light beams divergent with a small angle, which intersect spatially to form a viewing region The combination of the 2-D diaphragm array with vertical openings and the lens may be configured such that each diaphragm of the 2-D diaphragm array with vertical openings is corresponded to a position of pixel of the display screen, and the light beam of the pixel in the horizontal direction is restricted by the diaphragm to be a light beam divergent with a small angle, and all the light beams divergent with the small angle are further restricted by the lens to intersect spatially to form a viewing region.

The combination of the 2-D lenslet array, the vertical direction-selective diffusion screen and the cylindrical lens may be configured such that each lenslet of the 2-D lenslet array is corresponded to a position of pixel of the display screen, and the display screen is at a focal plane of the 2-D lenslet array; the light beam of the pixel in the horizontal direction is restricted by the lenslet to be a collimated beam, and all the collimated beams are further restricted by the vertical direction-selective diffusion screen and the cylindrical lens to become light beams divergent with a small angle, which intersect spatially to form a viewing region.

The display screen may be an LED display screen, a liquid crystal screen of high frame frequency, a plasma display screen of high frame frequency, or an organic light emitting screen. The lens may be a spherical lens or a cylindrical lens. The lenslet may be a conventional lens, a lens produced with binary optical method or a lens produced with holographic method. The vertical direction-selective diffusion screen may be a bar grating in the vertical direction.

According to the present invention, it is possible to restrict the light emitted upon displaying an image such that when the screen device operates to, in the order of viewing-fields, rotate while displaying on-by-one the 2-D images, of a spatially 3-D scene for a series of viewing-fields, that are decomposed according to the viewing-points around the spatially 3-D scene, the image for a certain viewing-field at a certain moment can be seen only by the viewer at the corresponding viewing-field, and the eyes of the viewer see different images with a proper parallax so that a proper effect of stereoscopic parallax can be formed. The spatially 3-D display with omnidirectional views based on the present invention enables a plurality of persons to perform a surrounding view with naked eye within 360° in a circle, and can realize blanking of a spatial 3-D scene.

The present invention will be described in more detail in the following with reference to accompany drawings and specific embodiments.

DETAILED DESCRIPTION OF THE EMBODIMENTS

The 3-D display of spatial scene for an object according to the invention is based in principle on omnidirectional-view display in 3-D space. In brief, omnidirectional-view display in a 3-D space mimics actual viewing of a 3-D object by a person. A viewer, when performing view around an object, can sense its spatial position and relationship, because the viewer's eyes see different parallax views. When the viewer moves around the object, the observed view for the object changes accordingly. Therefore if an object can be presented from respective images of viewing-field in those directions around the object in the order of the viewing-fields, then the image seen by the viewer will be identical to the case in which the 3-D object is viewed directly. In this manner, 3-D display of spatial scene for an object turns out to obtain a omnidirectional-view image for the object, decompose the omnidirectional-view image into a combination of two-dimensional (2-D) images from a series of viewing-fields according to the viewing-points around the object, and display the 2-D images of the corresponding viewing-fields in the order of the viewing-fields while rotating, with the 2-D images of the viewing-fields collectively constituting a 360° circle viewing-field of the object. In this manner, a spatial 3-D scene can be truly reproduced as long as there are sufficient images of viewing-field for the object to be reproduced. Typically, in order to have a lifelike 3-D display, images of at least 300 viewing-angles are required for the 360° viewing-field.

The present invention relates to a technology for 3-D display with omnidirectional views, which is essential for solving the contradiction between reality and blanking in spatial 3-D display, and is a spatial 3-D display technology having spatial 3-D display properties and enabling 360° surrounding view from a plurality of viewers. According to the principle for human eyes to view a real spatial 3-D object, it is possible to truly reproduce a 3-D scene in space in a omnidirectional-view manner because of the persistence of vision for human eyes, so that a person can view a spatially 3-D scene with naked eye at any position within 360° around a display device and a 3-D display effect with blanking of the spatial 3-D scene can be realized. It is crucial for a blanking technology for the 3-D scene in omnidirectional views that the 2-D image for each viewing-field can be seen only by the viewer at the corresponding viewing-angle, but not by a viewer of another viewing-field who should only see the 2-D image of his/her corresponding viewing-field.

Figure 1:
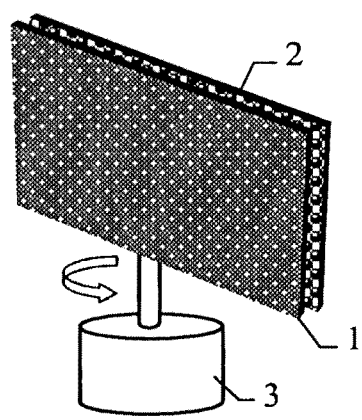
FIG. 1 is a view showing a screen device for spatially 3-D display with omnidirectional views.

As shown in FIG. 1, a screen device for spatially 3-D display with omnidirectional views comprises a display screen 2, a screen rotation device 3, and an optical device 1 disposed in a front side of the display screen. The display screen 2 operates to, in the order of viewing-fields, rotate while displaying on-by-one the 2-D images for the respective viewing-angles of a spatially 3-D scene. In order that the 2-D image for a certain viewing-field at a certain moment can be seen only by the viewer at the viewing-field but not by a viewer at another position, the following two properties need to be met.

First, the display screen 2 should have a sufficiently high display frame frequency so that the 2-D images of different viewing-angles are altered in a sufficiently high speed for display and present no sense of halt to human eyes. Assuming the display screen 2 displays 360 images per rotation, and its rotation speed should be kept above 30 rotations per second in order that human eyes cannot feel the rotation of the screen device, then the frame frequency for the display screen 2 should be 10,800 frames per second. Conventional displays cannot meet this requirement on frame frequency; however, LED has a very short response time (at nanosecond level), which can fully meet this display speed, and hence an LED display screen can be selected as the display screen 2. Alternatively, the display screen 2 can also be a liquid crystal screen of high frame frequency, an organic light-emitting screen or a plasma display screen of high frame frequency.

Second, the light emitted from the image on the display screen 2 has to be restricted within a small divergent angle so as to ensure (A) it is visible to only the viewer at the viewing-angle, but not the viewers at other positions, and (B) the eyes of the viewer can still see different images with a proper parallax so that a proper effect of stereoscopic parallax can be obtained. This property determines, in fact, an optimal distance of view. Assuming the display screen 2 displays M images per rotation, i.e. displays one corresponding image for a viewing-angle of (360°/M); since the distance between both human eyes is around 7 cm, the longest viewing distance d with a stereoscopic vision sense will be $$d=7/\tan(360°/M)$$

As is apparent, as the number of images M displayed per rotation of the display screen 2 increases, the viewing distance d with stereoscopic sense from different viewing-angles is farther. If the viewer views beyond this distance, then it may be possible to form a stereoscopic display effect of different viewing-angles, but not a stereoscopic vision effect generated by parallax.

In order to ensure that the image displayed by the display screen 2 at every viewing-angle position can be viewed only by the viewer at the particular orientation of viewing-angle, the light beam emitted from a pixel on the display screen 2 cannot be a Lambertian body as previously and commonly seen, but be within a certain range of divergent angles (typically 2×(360°/M)) in the horizontal direction. In order to achieve display of such a divergent angle, the optical device 1 is provided to restrict in the horizontal direction the light emitted by the display screen 2, so that the image on the display screen 2 forms a viewing region of a vertical plane shape in space; the viewing region is preferably in superposition with an eye pupil of the viewer to ensure that each one image on the display screen 2 is only seen by the viewer at a certain viewing-angle position and that the image on the display screen 2 can be seen by the viewer even as he/she moves in a vertical direction at this viewing-angle.

Figure 2:
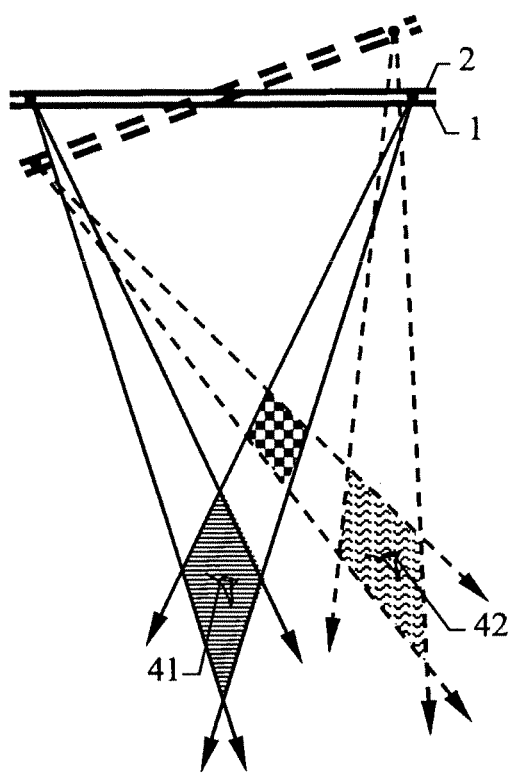
FIG. 2 is a conceptual top view showing the manner of using rotation of the screen device and using an optical device to restrict lighting of a display screen in a horizontal direction to realize a stereoscopic vision effect.

As shown in FIG. 2, the principle of achieving a stereoscopic vision effect by rotation of screen device and by restriction of lighting of the display screen 2 in the horizontal direction by the optical device 1 is as follows. The optical device 1 restricts a divergent angle of light beam of a pixel of the display screen 2 in the horizontal direction into a small range, and the light emitted by all pixels of the display screen 2 after being restricted will intersect to form a viewing region. Only when the eyes of the viewer are positioned within the viewing region, the light beams emitted from all the pixels on the display screen 2 can be fully received and the complete image information displayed on the display screen 2 can be seen. Once the eyes of the viewer are away from the region, the light beams emitted from all the pixels on the display screen 2 cannot be fully received, which causes the image information seen by the viewer to be incomplete or even invisible. Assuming, at the position shown by the solid lines, the light emitted from all the pixels of the display screen is restricted by the optical device and then intersected in space to form the viewing-region, which is shown as being filled with the horizontal lines, the image for the viewing-field of left-eye will be displayed on the display screen 2; the screen device reaches the position shown with the broken lines after being rotated by an angle, and the light emitted from all the pixels of the display screen is restricted by the optical device 1 to form the viewing-region, which is shown as being filled with the wave lines, the image for the viewing-filed of right-eye will be displayed on the display screen 2 at this time. When the left eye 41 of the viewer is within the viewing region filled with the horizontal lines and the right eye 42 is within the viewing region filled with the wave lines, the image information for the left and right viewing-fields seen by the left and right eyes respectively will be proper and complete, and the viewing-field images for both eyes can be merged by the brain to generate a sense of stereoscopic vision. If the eyes of the viewer move away from the viewing regions, the accuracy of the viewing-field images for both eyes when he/she views will be affected. As an example, if one eye of the viewer is within the rhombic region in the drawing, which is filled in a tessellated pattern, a part of the viewing-field image for left-eye and a part of the viewing-field image for right-eye will be seen concurrently, which causes the image information to be mixed up and a proper stereoscopic vision effect cannot be achieved.

The optical device 1 as described may be a 2-D diaphragm array with inclined openings, a vertical lenticular lens array, a combination of a 2-D diaphragm array with vertical openings and a lens, or a combination of a 2-D lenslet array, a vertical direction-selective diffusion screen and a cylindrical lens.

Figure 3:
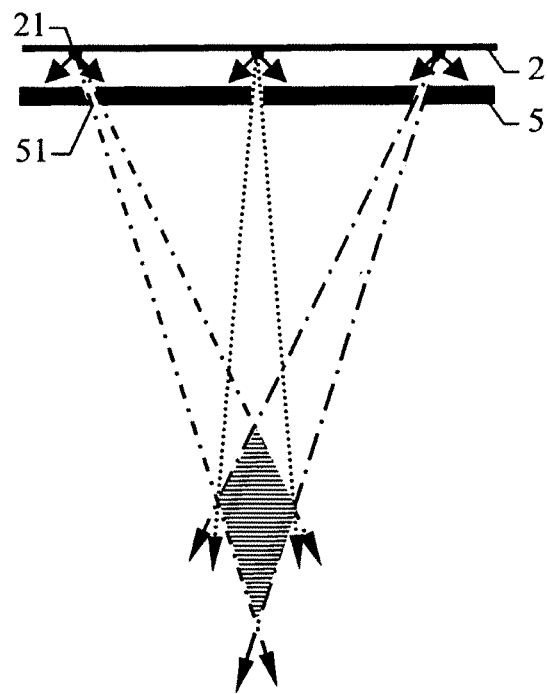
FIG. 3 is a conceptual top view showing the manner of using a 2-D diaphragm array with inclined openings to restrict lighting of the pixels of a display screen in a horizontal direction to form a viewing region.

FIG. 3 shows the situation of 2-D diaphragm array with inclined openings. Each diaphragm 51 in the 2-D diaphragm array 5 with inclined openings is corresponded to a position of pixel 21 of the display screen 2, and the light beam of the pixel 21 in the horizontal direction is restricted by the diaphragm 51 to be a light beam divergent with a small angle; the lines connecting the openings of all the diaphragms with the respective positions of their corresponding pixels intersect spatially to form the viewing region. The diaphragms 51 may be non-circular, but have a relatively larger diameter in the vertical direction to ensure a relatively large viewing range in a vertical plane for the viewer, and a strictly limited diameter in the horizontal direction to ensure the accuracy of images for the viewing field of both eyes when the viewer is viewing.

Figure 4:
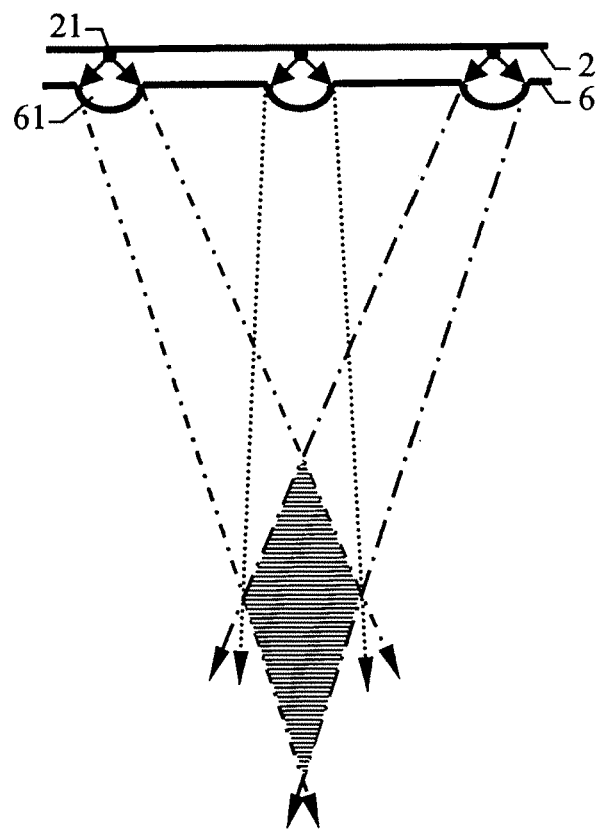
FIG. 4 is a conceptual top view showing the manner of using a vertical lenticular lens array to restrict lighting of the pixels of a display screen in a horizontal direction to form a viewing region.

FIG. 4 shows the situation of vertical lenticular lens array. Each vertical lenticular lens 61 of the vertical lenticular lens array 6 is corresponded to a column position of a respective pixel 21 of the display screen 2; with the radius of curvature of the lenticular surface being designed to restrict the light beam only in the horizontal direction, the light beams in the horizontal direction of all the columns of the pixels are restricted by their corresponding vertical lenticular lenses to become light beams divergent with a small angle, which intersect spatially to form the viewing region.

Figure 5:
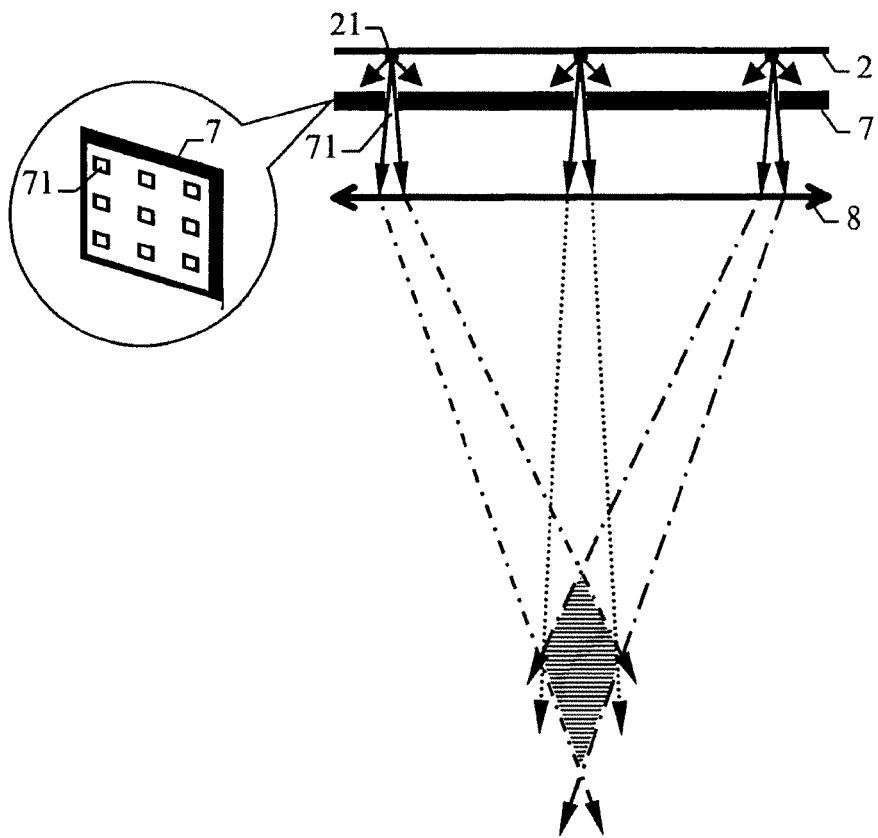
FIG. 5 is a conceptual top view showing the manner of using a combination of a 2-D diaphragm array with vertical openings and a lens to restrict lighting of the pixels of a display screen in a horizontal direction to form a viewing region.

FIG. 5 shows the situation of combination of a 2-D diaphragm array with vertical openings and a lens. Each diaphragm 71 of the 2-D diaphragm array 7 with vertical openings is corresponded to a position of pixel 21 of the display screen 2, and the light beam of the pixel 21 in the horizontal direction is restricted by the diaphragm 71 to be a light beam divergent with a small angle; all the light beams divergent with the small angle are further restricted by the lens 8 to intersect spatially to form the viewing region. The lens 8 may be a spherical lens or a cylindrical lens.

Figure 6:
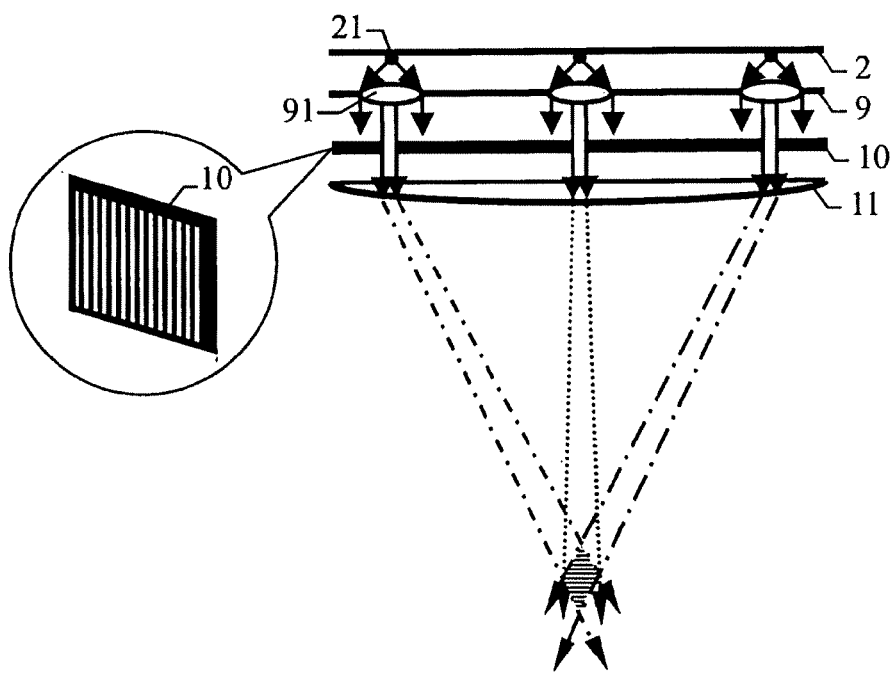
FIG. 6 is a conceptual top view showing the manner of using a combination of a 2-D lenslet array, a vertical direction-selective diffusion screen and a cylindrical lens to restrict lighting of the pixels of a display screen in a horizontal direction to form a viewing region.

FIG. 6 shows the situation of combination of a 2-D lenslet array, a vertical direction-selective diffusion screen and a cylindrical lens. Each lenslet 91 of the 2-D lenslet array 9 is corresponded to a position of pixel 21 of the display screen 2, and the display screen 2 is at a focal plane of the 2-D lenslet array 9; the light beam of the pixel 21 in the horizontal direction is restricted by the lenslet 91 to be a collimated beam, and all the collimated beams are further restricted by the vertical direction-selective diffusion screen 10 and the cylindrical lens 11 to become light beams divergent with a small angle, which intersect spatially to form the viewing region. The lenslet 91 may be a conventional lens, a lens produced with binary optical method or a lens produced with holographic method. The vertical direction-selective diffusion screen 10 is a bar grating in the vertical direction.

What is claimed is:

1. A screen device realizing spatially three-dimensional (3-D) display with omnidirectional views, characterized in comprising a display screen (2), a screen rotation device (3), and an optical device (1) disposed in a front side of the display screen, wherein the optical device (1) is a combination of a 2-D diaphragm array with vertical openings and a lens, and the display screen rotates while displaying on-by-one 2-D images for the respective viewing-angles of a spatially 3-D scene.

2. The screen device realizing spatially 3-D display with omnidirectional views according to claim 1, wherein the 2-D diaphragm array (5) with inclined openings is configured such that each diaphragm (51) in the 2-D diaphragm array (5) with inclined openings is corresponded to a position of pixel (21) of the display screen (2), and the light beam of the pixel (21) in the horizontal direction is restricted by the diaphragm (51) to be a light beam divergent with a small angle; the lines connecting the openings of all the diaphragms with the respective positions of their corresponding pixels intersect spatially to form a viewing region.

3. The screen device realizing spatially 3-D display with omnidirectional views according to claim 1, wherein the vertical lenticular lens array (6) is configured such that each vertical lenticular lens (61) of the vertical lenticular lens array (6) is corresponded to a column position of a respective pixel (21) of the display screen (2), and the light beams in the horizontal direction of all the columns of the pixels are restricted by their corresponding vertical lenticular lenses to become light beams divergent with a small angle, which intersect spatially to form a viewing region.

4. The screen device realizing spatially 3-D display with omnidirectional views according to claim 1, wherein the combination of the 2-D diaphragm array (7) with vertical openings and the lens (8) is configured such that each diaphragm (71) of the 2-D diaphragm array (7) with vertical openings is corresponded to a position of pixel (21) of the display screen (2), and the light beam of the pixel (21) in the horizontal direction is restricted by the diaphragm (71) to be a light beam divergent with a small angle, and all the light beams divergent with the small angle are further restricted by the lens (8) to intersect spatially to form a viewing region.

5. The screen device realizing spatially 3-D display with omnidirectional views according to claim 4, wherein the lens (8) is a spherical lens.

6. The screen device realizing spatially 3-D display with omnidirectional views according to claim 1, wherein the combination of the 2-D lenslet array (9), the vertical direction-selective diffusion screen (10) and the cylindrical lens (11) is configured such that each lenslet (91) of the 2-D lenslet array (9) is corresponded to a position of pixel (21) of the display screen (2), and the display screen (2) is at a focal plane of the 2-D lenslet array (9); the light beam of the pixel (21) in the horizontal direction is restricted by the lenslet (91) to be a collimated beam, and all the collimated beams are further restricted by the vertical direction-selective diffusion screen (10) and the cylindrical lens (11) to become light beams divergent with a small angle, which intersect spatially to form a viewing region.

7. The screen device realizing spatially 3-D display with omnidirectional views according to claim 6, wherein the lenslet (91) is a conventional lens, a lens produced with binary optical method or a lens produced with holographic method.

8. The screen device realizing spatially 3-D display with omnidirectional Views according to claim 6, wherein the vertical direction-selective diffusion screen (10) is a bar grating in the vertical direction.

9. The screen device realizing spatially 3-D display with omnidirectional views according to claim 1, wherein the display screen is an LED display screen.

10. The screen device realizing spatially 3-D display with omnidirectional views according to claim 1, wherein the display screen displays images of at least 300 viewing-angles per rotation, and is rotated at a speed above 30 rotations per second.

* * * * *